Sept. 11, 1951 W. A. BEDFORD, JR 2,567,902
FASTENER MEMBER
Filed Feb. 8, 1947 2 Sheets-Sheet 1
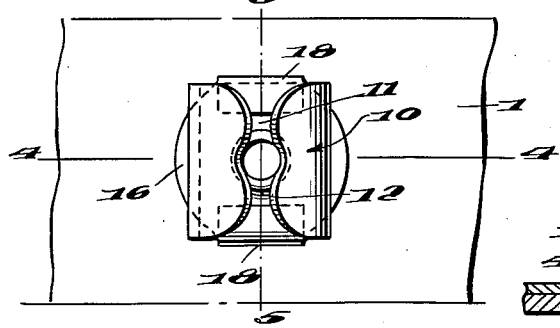
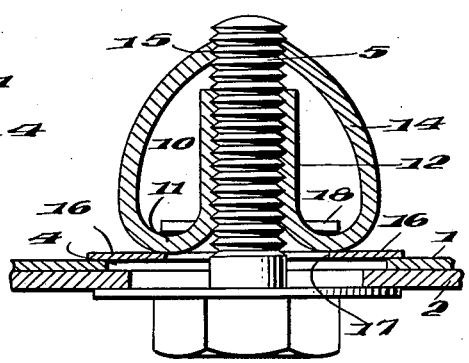
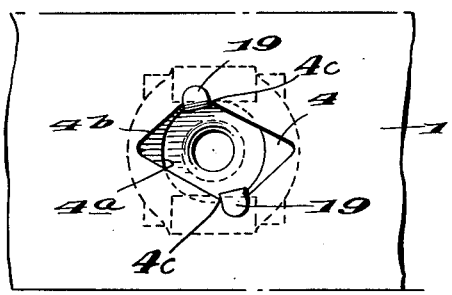
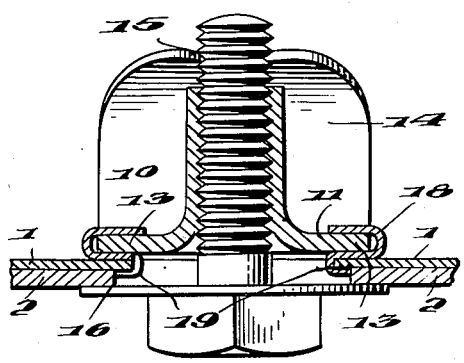
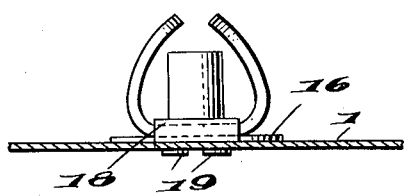
Inventor
WILLIAM A. BEDFORD, JR.
By John Todd
Attorney Sept. 11, 1951  W. A. BEDFORD, JR  2,567,902
FASTENER MEMBER
Filed Feb. 8, 1947  2 Sheets-Sheet 2
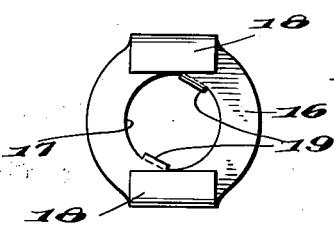
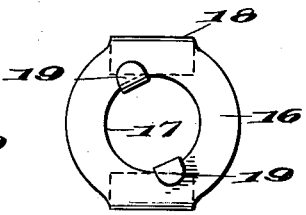
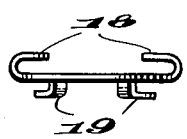
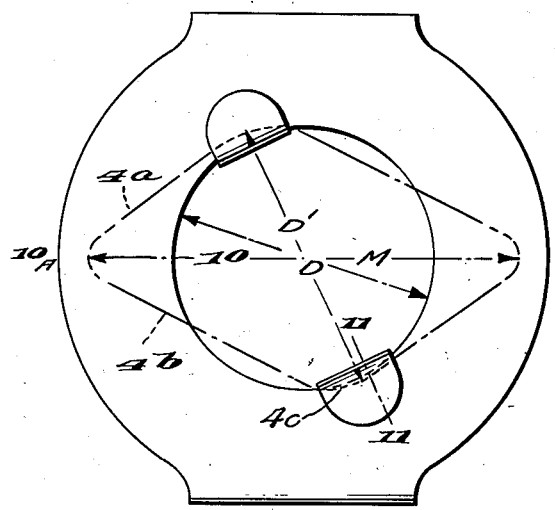
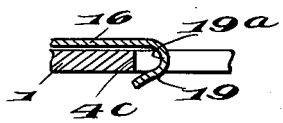
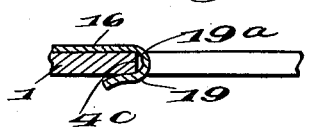
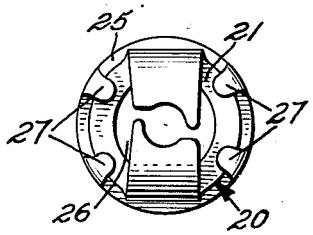
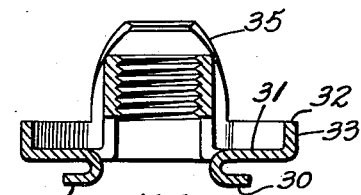
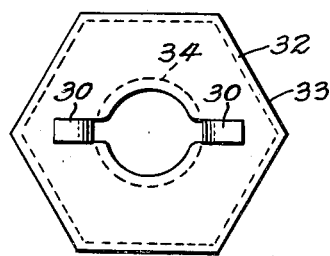
Inventor
WILLIAM A. BEDFORD, JR.
By John Todd
Attorney Patented Sept. 11, 1951

2,567,902

UNITED STATES PATENT OFFICE 2,567,902

FASTENER MEMBER

William A. Bedford, Jr., North Scituate, Mass., assignor to United-Carr Fastener Corporation, Cambridge, Mass., a corporation of Massachusetts Application February 8, 1947, Serial No. 727,343

3 Claims. (Cl. 85—32)

The present invention relates to fasteners, and aims generally to improve existing fasteners.

One of the primary objects of the present invention is the provision of an improved fastener member which may be readily secured to an apertured supporting member by a rotary or turning action.

A further object of the invention is the provision of a rotary attachable retainer member for female or socket fastener members that will provide for shiftability of the fastener member relative to the aperture of the support for ready alignment of a stud or screw passed therethrough.

The above and other objects of the invention will be apparent to persons skilled in the art from a consideration of the accompanying drawings and annexed specification, illustrating and describing preferred embodiments of the invention.

In the drawings—

Fig. 1 is a top plan view of an installation embodying a screw-receiving fastener according to one embodiment of the invention;

Fig. 2 is a bottom plan view of the installation shown in Fig. 1;

Fig. 3 is a side elevation of the installation shown in Fig. 1;

Fig. 4 is an enlarged longitudinal sectional view of an installation embodying the fastener shown in Fig. 1, as taken on the line 4—4 of Fig. 1;

Fig. 5 is an enlarged transverse sectional view of an installation embodying the fastener shown in Fig. 1 as taken on the line 5—5 thereof;

Fig. 6 is a top plan view of the fastener retainer member shown in Fig. 1;

Fig. 7 is a bottom plan view of the retainer member shown in Fig. 6;

Fig. 8 is a side elevation thereof;

Fig. 9 is an enlarged plan view of the apertured supporting plate and the locking tabs of the fastener member according to a preferred embodiment of the invention;

Fig. 10 is an enlarged detail sectional view taken on the line 10—10 of Fig. 9, showing the relative position of the attaching hooks of the retainer in the support aperture as the fastener is initially applied to the support;

Fig. 11 is a detail sectional view taken on the line 11—11 of Fig. 9, showing the relative position of the attaching hooks of the fastener with reference to the support when the fastener has been turned to locked position;

Fig. 12 is a top plan view of a rotary stud or cowl type fastener member according to the invention;

Fig. 13 is a side elevation of the fastener shown in Fig. 12;

Fig. 14 is a vertical sectional view of a one-piece sheet metal nut having integral attaching means thereon; and Fig. 15 is a bottom plan view of the nut shown in Fig. 13.

The invention provides an improved construction of fastener member suitable for screw or rotary stud or like male fasteners in which the stud-receiving fastener member may be readily and securely attached, without the use of rivets or like fastenings, to an apertured supporting member which may comprise one of the parts to be secured together.

In fastener secured installations, two apertured parts, for example sheet metal plates 1 and 2, are fastened together in assembled relation, by means of a fastener stud or male member passed through the apertures of said parts and lockingly engaged with a female or socket member secured to an outer face of one part which usually is a supporting member. It is frequently desirable to provide a shiftable mounting for the female or socket member so that it may be readily aligned with a male member passed through the apertures of the parts 1 and 2, and usually the mounting is attached to the supporting part by rivets or like fastenings.

The present invention provides an improved fastener member, including a shiftable mounting for the female or socket part of the fastening which may be readily and securely attached to the apertured supporting member without the use of rivets or like additional fastenings.

Referring to the drawings, and particularly to Figs. 1 to 9 inclusive, there is provided an improved screw-receiving floatable fastener adapted for attachment to a support 1 provided with an elongated aperture 4 by a simple rotary or turning action. The support aperture 4 may be of any suitable elongated shape, or may be circular with radial elongations so as to permit passage of attaching hooks on the retainer. As herein illustrated, particularly in Figs. 2 and 9, the aperture 4 is generally in the shape of an obtuse parallelogram having long and short sides 4a and 4b disposed in obtuse angular relation, and preferably at such an obtuse angle as to provide an easy camming edge. The apices 4c between the sides 4a and 4b along the shorter diagonal of the aperture are preferably arcuate and provide seats for hook-shaped locking members on the fastener and the major diagonal of the aperture 4 is sufficiently long to permit free passage therethrough of the hook-shaped locking members of the female fastener member.

The female or socket fastener member, in the form illustrated in Figs. 1 to 5, is a nut member 10 having a base 11 provided with an integral tubular screw-receiving barrel 12 drawn from the base and extending therefrom in a direction normal thereto. The tubular barrel 12 is internally threaded to threadedly receive a screw 5 employed to secure the parts 1 and 2 together in the usual manner.

The barrel 12 is disposed wholly within the marginal edges of the base 11 providing surrounding base side flanges 13 and end extensions 14, the latter preferably being upwardly bent or turned to provide stop means for the retainer hereinafter described.

Preferably the upturned end extensions 14 extend obliquely beyond the upper open end of the barrel 12, terminating in concaved threaded seats 15 spaced above and disposed radially inwardly of the threaded walls of the barrel 12 to provide resilient screw-engaging means for tensioned engagement with a screw 5 to resist loosening rotation thereof within the barrel 12 as described and claimed in my copending application Serial No. 724,413, filed January 25, 1947, which has become abandoned. As will be understood, engagement of the threaded seats 15 by the screw 5 will displace the seats outwardly in a direction radially of the barrel 12 or screw 5, and will cause the seats 15 to exert a drag upon the screw 5 resisting rotation thereof in the nut.

To readily align the bore of the nut barrel 12 with the screw-receiving aperture 4 of the support 1, the nut may be mounted on a retainer member, preferably of thin heat-treated sheet metal, having a base 16 apertured at 17 and opposed parallel inturned flanges or channel guides 18 adapted to loosely receive the base side flanges 13 of the nut. The retainer plate 16 and channel guides 18 for the nut may be as described and claimed in my copending application Serial No. 727,344, filed February 8, 1947, which has become abandoned, to which reference is made for a further detailed explanation.

The inner peripheral edge portion of the base 16 surrounding the aperture 17 is provided with depending outwardly turned attaching members or hooks 19 and preferably these are diametrically opposed on a diameter oblique to a diameter at right angles to the channel guides 18.

The attaching members or hooks 19 will be so shaped and proportioned that the diameter between the inner concaved surfaces 19$^a$ will be substantially equal to, and preferably slightly greater than the length of the diagonal D' between the arcuate apices 4$^c$ or seats of the support aperture 4. The diameter D of the aperture 17 of the retainer 16 will thus be approximately equal to the minor diagonal D' of the aperture 4 but substantially less than the major diagonal M as illustrated in Fig. 9. The inner faces 19$^a$ of attaching hooks 19 are preferably not normal to a radius of the opening 17, but are preferably slightly oblique thereto for better camming and coaction with the edges 4$^b$ of the support aperture 4.

The invention may be embodied in other types of socket fasteners than screw-receiving nuts. As is illustrated in Figs. 12 and 13, there is provide a stud-receiving socket member 20 of the rotary operative or cowl fastener type which may be shiftably mounted upon a retainer plate 25. The socket member conveniently may be of the type and construction shown in my prior Patent No. 2,306,928, dated December 29, 1942, and comprises a base portion 21 formed with an embossed apertured seat 22 adapted to permit the passage of and lock with a rotary stud member formed with radial arms (not shown), but which is well understood in the art.

The retainer member 25 preferably may be a flat thin sheet metal plate centrally apertured as at 26 and provided with a plurality of channel shaped fingers 27 or tongues on the outer periphery thereof, which tongues loosely overlie opposed peripheral portions of the fastener base 21. Oppositely disposed attaching hooks 28 are formed on said retainer and depend from the periphery of the aperture 26 thereof in the same manner as the attaching members 19.

A further modified form of the invention is illustrated in Figs. 14 and 15, wherein the attaching hooks 30 are formed as an integral part of the fastener base. As herein illustrated, the fastener may be in the form of a hex-nut having a base 31 provided with a peripheral upstanding hexagonal flange 32 providing opposed wrench-engaging surfaces 33. The base 31 is also formed with a central integral internally threaded tubular barrel 34 to receive a screw as in the embodiment shown in Figs. 1 to 5, and if desired, the nut may have screw-engaging tensioning wings 35 as described in my copending application Serial No. 724,413, filed January 25, 1947.

From the above it will be apparent that the invention provides a simple and efficient form of fastener, particularly for screw threaded fastenings, which may be quickly and readily attached to a supporting member without the necessity of separate attaching rivets or like fastenings. The formation of the elongated support aperture is a simple stamping operation and provides an opening having camming surface to engage the attaching hooks of the fastener member under tension. Thus, when the fastener is rotated so that the attaching hooks are aligned with the minor axis of the opening 4, the hooked tongues 19 will engage in the seats 4$^c$ with a snap-like action which is substantially secure against accidental unfastening.

While I have illustrated and described my invention with particular reference to three illustrated embodiments thereof, I do not intend to be limited thereto as the scope of the invention is best defined in the appended claims.

I claim:

1. A fastener member for attachment to a supporting panel having an aperture of obtuse parallelogram shape with a longer diagonal dimension between one pair of diagonally opposed corners than that between the other pair of diagonally opposed corners, said fastener member comprising a flat support-engaging plate portion with a centrally disposed opening, a male fastener-receiving portion associated with said plate portion having a stud-receiving aperture in substantial alignment with said opening in said plate portion, said plate portion being provided with opposed yieldable hook shaped attaching tongues extending from opposite side edges of said opening to provide connecting portions disposed substantially normal to the plate portion and end portions extending in opposite directions substantially normal to said connecting portions, said connecting portions presenting surfaces for engaging opposed edges of said panel aperture, said surfaces being spaced apart a distance substantially equal to the shorter diagonal dimension of said panel aperture and greater than the perpendicular distance between said opposed edges of said panel aperture and the opposite ends of said tongues being spaced apart a distance not greater than the longer diagonal dimension of said panel aperture, whereby the fastener member may be secured to said panel by inserting the tongues into said panel aperture aligned along the longer diagonal of said panel aperture and turning the fastener member to snap the tongues into engagement with the edges of the panel aperture in alignment with the shorter diagonal of said panel aperture.

2. A fastener of the class described in accordance with claim 1 wherein the male fastener-receiving portion is separate from the plate portion and has an outwardly extending base flange and the plate portion has a second pair of tongues extending from opposite outer edges thereof and overlying said flange.

3. A fastener of the class described in accordance with claim 1 wherein the fastener member has polygonal shaped flange means on the outer peripheral portions of the plate portion presenting opposed flat wrench-engaging surfaces for rotating the fastener member relative to the supporting panel.

WILLIAM A. BEDFORD, Jr.

REFERENCES CITED

The following references are of record in the file of this patent:

UNITED STATES PATENTS

| Number | Name | Date |
|---|---|---|
| 1,744,488 | Mitchell | Jan. 21, 1930 |
| 1,805,460 | Carr | May 12, 1931 |
| 2,078,411 | Richardson | Apr. 27, 1937 |
| 2,079,918 | Mitchel | May 11, 1937 |
| 2,233,242 | Burke | Feb. 25, 1941 |
| 2,249,923 | Whitcombe | July 22, 1941 |
| 2,314,756 | Bedford | Mar. 23, 1943 |
| 2,406,415 | Tinnerman | Aug. 27, 1946 |

FOREIGN PATENTS

| Number | Country | Date |
|---|---|---|
| 483,089 | Great Britain | Apr. 12, 1938 |
| 654,624 | Germany | Feb. 5, 1940 |